United States Patent
Xuan et al.

(10) Patent No.: US 6,535,352 B2
(45) Date of Patent: *Mar. 18, 2003

(54) HEAD MEDIA INTERFACE FOR STICTION CONTROL

(75) Inventors: Jack Jialno Xuan, Milpitas, CA (US); Thanh Duc Nguyen, Fremont, CA (US); Chung Yuang Shih, Cupertino, CA (US)

(73) Assignee: Seagate Technology LLC, Scotts Valley, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/123,691

(22) Filed: Jul. 28, 1998

(65) Prior Publication Data

US 2002/0089785 A1 Jul. 11, 2002

Related U.S. Application Data

(60) Provisional application No. 60/069,479, filed on Dec. 15, 1997.

(51) Int. Cl.[7] .................................................. G11B 5/82
(52) U.S. Cl. ................................... 360/135; 360/237.1
(58) Field of Search ........................ 360/135, 103, 360/131, 237.1

(56) References Cited

U.S. PATENT DOCUMENTS

| | | | |
|---|---|---|---|
| 5,062,021 A | 10/1991 | Ranjan et al. | 360/135 |
| 5,067,037 A | 11/1991 | Ananth et al. | 360/103 |
| 5,200,867 A | 4/1993 | Albrecht et al. | 360/103 |
| 5,202,803 A | 4/1993 | Albrecht et al. | 360/97.02 |
| 5,267,104 A | 11/1993 | Albrecht et al. | 360/97.02 |
| 5,345,353 A | 9/1994 | Krantz et al. | 360/103 |
| 5,418,667 A | 5/1995 | Best et al. | 360/103 |
| 5,424,888 A | 6/1995 | Hendriks et al. | 360/103 |
| 5,446,606 A | 8/1995 | Brunner et al. | 360/75 |
| 5,482,497 A | 1/1996 | Gonnella et al. | 451/57 |
| 5,499,149 A | 3/1996 | Dovek | 360/103 |
| 5,499,731 A | 3/1996 | Marshall | 216/22 |
| 5,508,077 A | 4/1996 | Chen et al. | 428/643 |
| 5,537,273 A | 7/1996 | Hendriks et al. | 360/103 |
| 5,550,691 A | 8/1996 | Hamilton | 360/103 |
| 5,550,693 A | 8/1996 | Hendriks et al. | 360/103 |
| 5,550,696 A | 8/1996 | Nguyen | 360/135 |
| 5,572,386 A | 11/1996 | Ananth et al. | 360/103 |
| 5,586,040 A | 12/1996 | Baumgart et al. | 364/474.08 |
| 5,625,512 A | 4/1997 | Smith | 360/103 |
| 5,626,941 A | 5/1997 | Ouano | 428/141 |
| 5,635,269 A | 6/1997 | Weir et al. | 428/65.3 |
| 5,726,831 A | 3/1998 | White | 360/103 |
| 5,768,055 A | 6/1998 | Tian et al. | 360/103 |
| 5,841,608 A | 11/1998 | Kasamatsu et al. | 360/103 |
| 5,912,791 A | 6/1999 | Sundaram et al. | 360/135 |

FOREIGN PATENT DOCUMENTS

| | | |
|---|---|---|
| JP | 56-107363 | 8/1981 |
| JP | 90-205699/27 | 11/1988 |
| JP | 08-069674 | 3/1996 |
| JP | 08-212740 | 8/1996 |
| JP | 08-287440 | 11/1996 |

OTHER PUBLICATIONS

*Effects of Laser Textured Disk Surfaces on a Slider's Flying Characteristics*, by Yong Hu and David B. Bogy for "American Society of Mechanical Engineers", Sep. 1997.

Primary Examiner—George J. Letscher
(74) Attorney, Agent, or Firm—Westman, Champlin & Kelly, P.A.

(57) ABSTRACT

A head media interface for contact starts and stops. The head media interface including a plurality of bumps extending from bearing surfaces of the slider and a data storage disc including a plurality of generally uniform holes extending below a relatively smooth base surface of the disc in a portion of the disc. The base surface interrupted by holes and the slider bumps forming a contact interface for CSS.

14 Claims, 10 Drawing Sheets

HEAD MEDIA INTERFACE FOR STICTION CONTROL

CROSS-REFERENCE TO RELATED APPLICATION

This application claims priority to Provisional Application Serial No. 60/069,479, filed Dec. 15, 1997, and entitled "LASER-TEXTURED HEAD-MEDIA INTERFACE AND MANUFACTURING PROCESSES FOR ULTRA-LOW GLIDE AND LOW STICTION PERFORMANCES."

BACKGROUND OF THE INVENTION

The present invention relates to a data storage system. In particular, the present invention relates to an improved head media interface for contact starts and stops.

Disc drives are well known in the industry. Such drives use rigid discs coated with a magnetizable medium for storage of digital information in a plurality of concentric data tracks. Typically, disc drives include a disc pack including a plurality of concentric discs mounted on a spindle motor which causes the discs to spin. Heads carrying transducer elements are supported relative to the disc surfaces to read and or write digital information to the disc surfaces.

Heads include a slider supported via a suspension assembly coupled to an actuator or "E" block. Sliders include an air bearing surface which faces the disc surface. As the disc rotates, the disc drags air onto the slider along the air bearing surface in a direction approximately parallel to the tangential velocity of the disc. As the air passes beneath the air bearing surface, the pressure between the disc and the air bearing surface increases, which creates a hydrodynamic lifting force that causes the slider to lift directly above the disc surface to read and/or write data to the surface of the disc.

Prior to rotation of the disc, the slider rests on the disc surface. The slider is not lifted from the disc until the hydrodynamic lifting force, caused by rotation of the disc, is sufficient to overcome a preload force supplied to bias the slider toward the disc surface, and a stiction force holding the slider to the disc surface. The hydrodynamic properties of the slider are affected by the speed of rotation of the disc, the design of the air bearing surface of the slider, and the preload force supplied to the slider via the suspension assembly.

Known discs include both landing zones and data zones on a disc surface. Data is stored in the data zone and landing zones are used to support the slider and provide a takeoff and landing surface for the slider for contact starts and stops (CSS). Textured landing zones are known which provide a roughened surface for reducing stiction between the slider and the disc surface for takeoff. Landing zones are also known which include bumps of different shapes and sizes formed on a disc surface by a laser technique or other technique to provide a surface for the slider to take off and land. Bumps provide a lower contact area between the slider and disc surface to lower the stiction force holding the slider to the disc surface.

Disc drives are being designed which have lower slider fly heights. Landing zones which are formed of bumps extending above a base surface of the disc may interfere with the slider at lower fly heights, and increase the glide avalanche dimension. Prior landing zone surface structures wear reducing the effectiveness of surface structures to reduce stiction. The present invention addresses these and other problems.

SUMMARY OF THE INVENTION

The present invention relates to a head media interface. The head media interface includes a plurality of bumps extending from bearing surfaces of the slider and a data storage disc including a plurality of generally uniform holes extending below a relatively smooth base surface of the disc in a portion of the disc. The base surface interrupted by holes and the slider bumps form a contact interface for CSS.

DETAILED DESCRIPTION OF THE PREFERRED EMBODIMENTS

Figure 1:
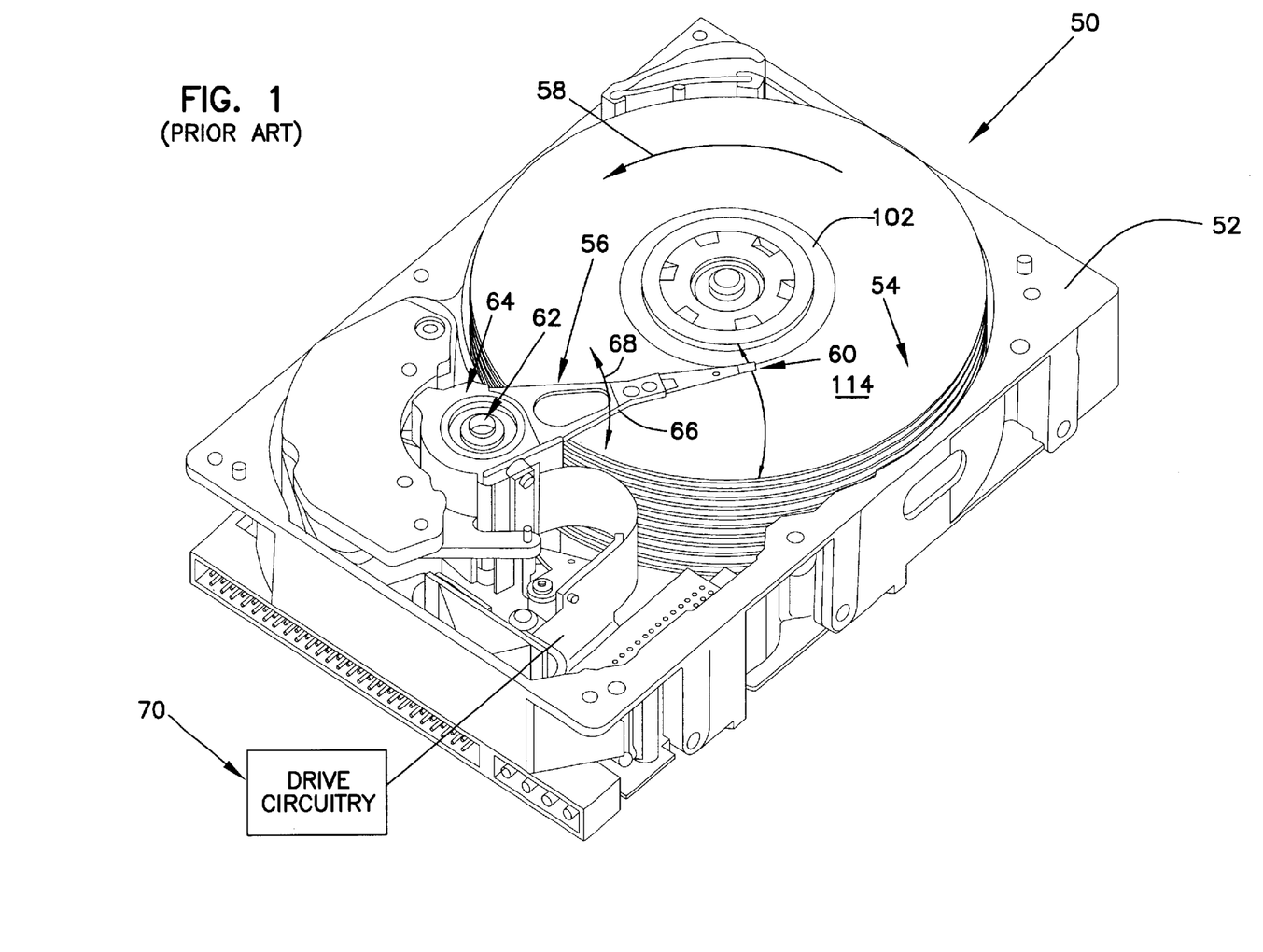
FIG. 1 is a perspective view of a data storage system of the prior art.

FIG. 1 illustrates a disc drive 50 including a chassis 52, discs 54, and actuator assembly 56. Discs 54 are rotationally coupled to chassis 52 via a spindle motor (not shown) for rotation, as illustrated by arrow 58. Actuator assembly 56 rotationally supports heads 60 for reading and/or writing data to and from discs 54. The actuator assembly includes actuator block 62 and voice coil motor (VCM) 64. As shown, actuator block 62 is rotationally coupled to chassis 52. The actuator block 62 includes a plurality of actuator arms 66 (only one shown in FIG. 1) to support heads 60 relative to the disc surface. The actuator block rotates as illustrated by arrow 68 to move heads 60 along an arcuate path for placement relative to data tracks of a disc 54 to read or write data relative to the disc surface. Movement of the actuator block 62 is controlled by voice coil motor 64, which is coupled to control circuitry of the disc drive illustrated by block 70.

Figure 2:
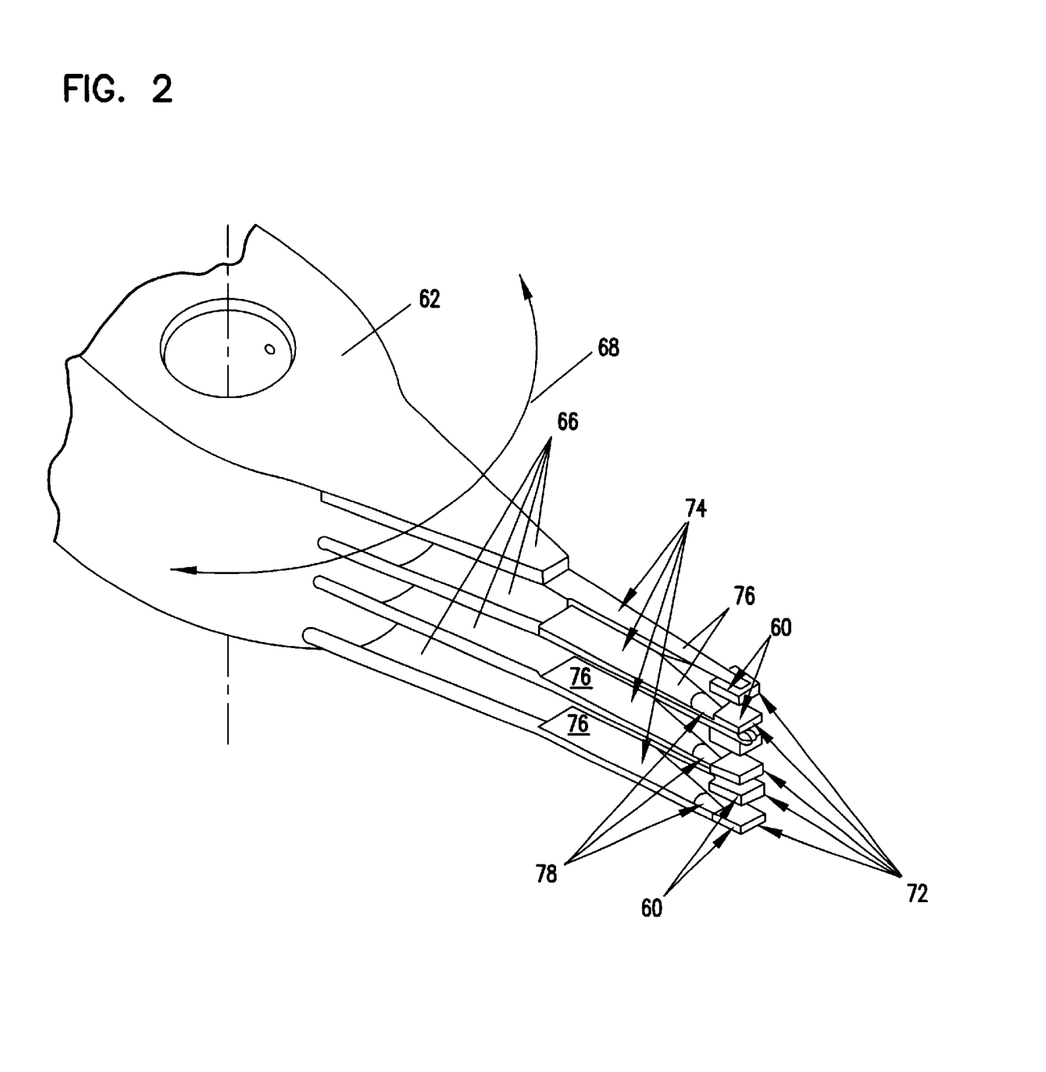
FIG. 2 is a perspective view of an actuator block supporting heads for read or write operations.
Figure 3:
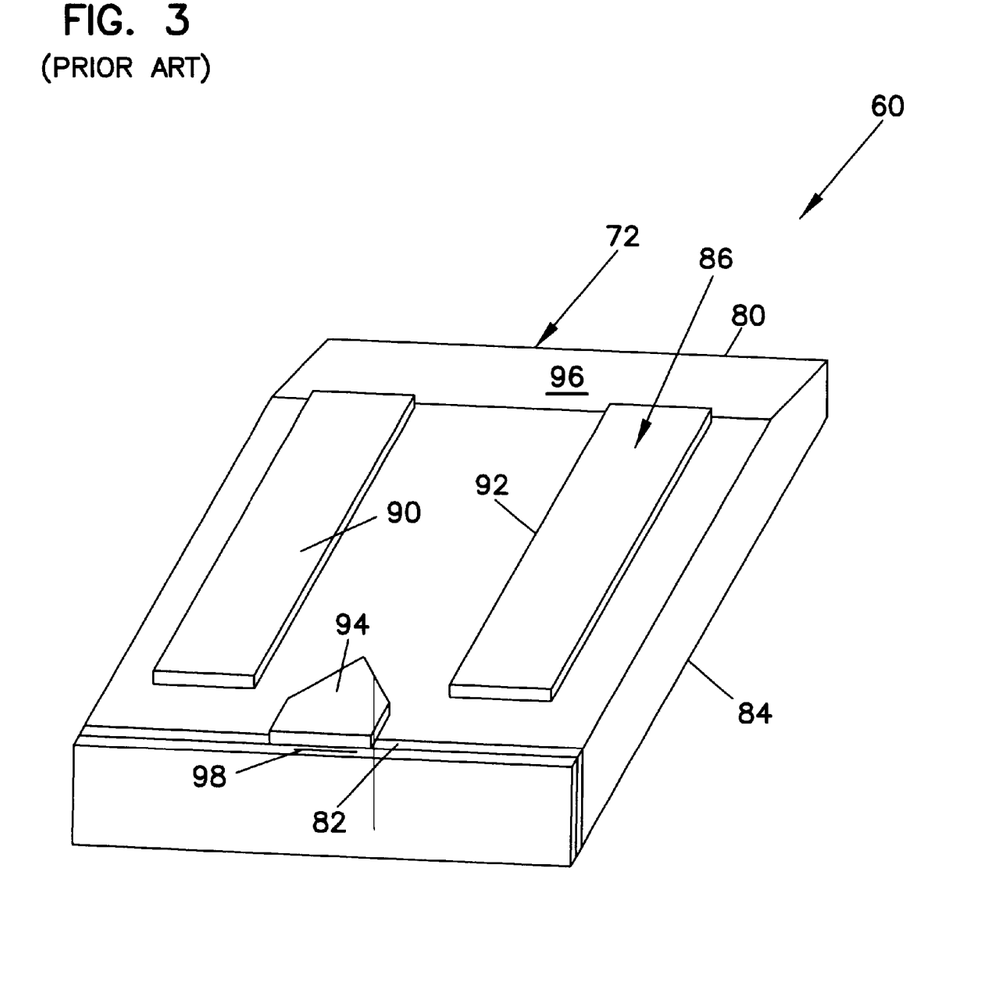
FIG. 3 is perspective view of a bearing surface of a slider.

As shown in FIG. 2, heads 60 include a slider 72 which supports transducer elements for read and write operations. Slider 72 is coupled to actuator block 62 via a suspension assembly 74 coupled to actuator arms 66. As shown in FIG. 2, suspension assembly 74 includes a load beam 74 and a gimbal spring 78. Gimbal spring 78 supports slider 72 to pitch, roll and follow the topography of the disc in a known manner. FIG. 3 illustrates one embodiment of a slider 72 formed of a rigid member including a leading edge 80, a trailing edge 82, an upper surface 84, and a lower air bearing surface 86. The upper surface 84 is operably coupled to gimbal spring 78 shown in FIG. 2 to flexibly support slider 72. The lower air bearing surface 86 faces the disc surface and includes raised side rails 90 and 92, and a center rail 94. Slider 72 includes a sloped leading surface 96 for "take-off". Center rail supports transducer 98 (illustrated diagrammatically) for read or write operations. Transducers may be inductive type transducers or magnetoresistive transducers. Discs 54 are rotated to create a hydrodynamic lifting force to lift the head 60 (slider 72) above the disc surface for proximity recording. Although a particular bearing surface is shown, it should be understood that alternate bearing designs may be used and application is not limited to a particular bearing design.

Prior to operation, slider is parked on the disc surface for contact starts and stops ("CSS"). Rotation of the discs 54 creates a fluid or air flow under the bearing surface from the leading edge surface 96 to raise the slider 72 above the disc surface for proximity recording. Stiction force holds the slider 72 to the disc surface and sufficient lift must be imparted to the bearing surface 86 to overcome the stiction holding the slider 72 to the disc surface. Prior discs have separate landing zones to park the slider prior to operation. FIG. 1 illustrates a landing zone 102 proximate sa center of the discs.

Figure 4:
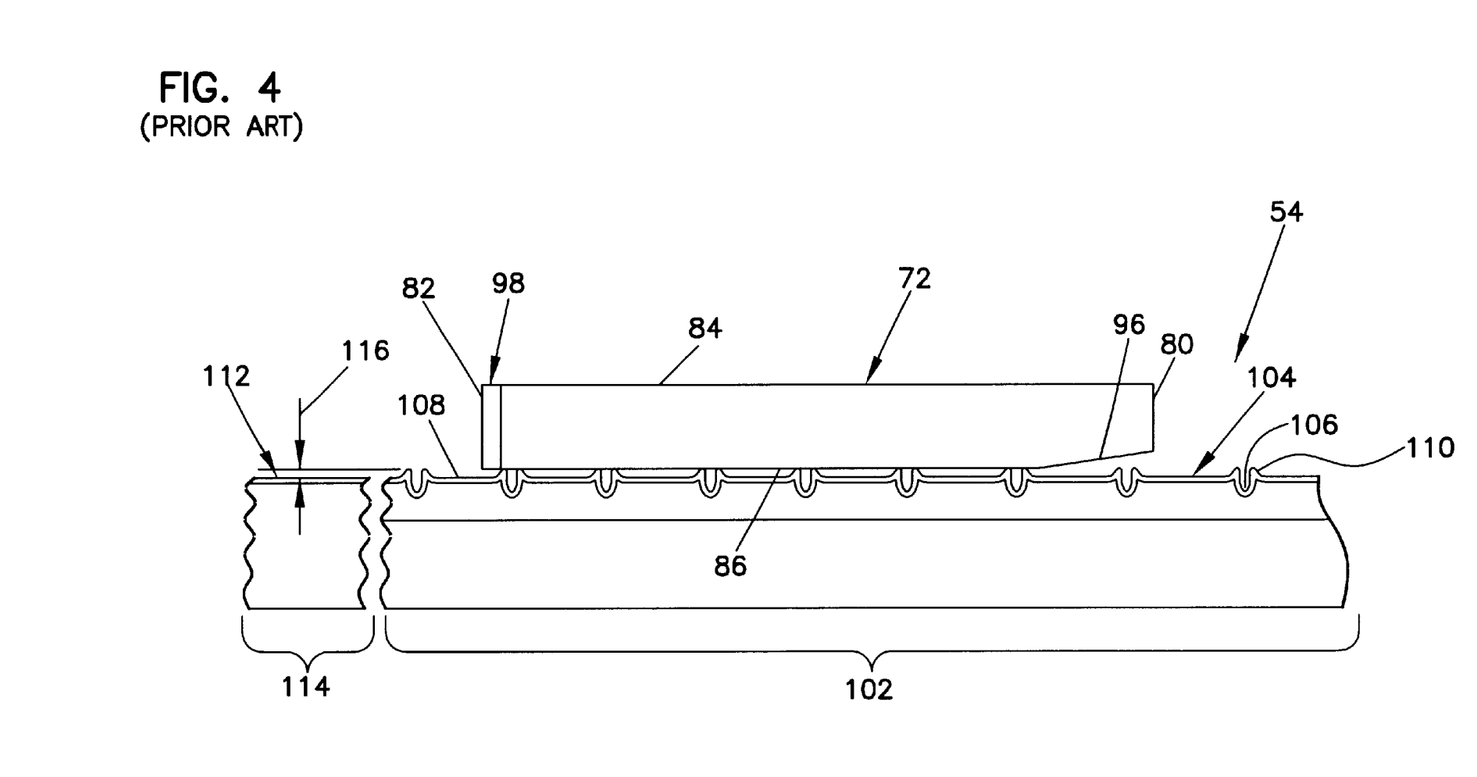
FIG. 4 is an illustrative view of a prior art disc surface and slider parked on a landing zone of the disc surface.

Prior landing zones were textured via mechanical texturing techniques and laser texturing techniques. FIG. 4 illustrates a disc having a laser textured surface 104 in the landing zone. As shown the laser texturing forms a plurality of holes 106 extending below a base surface 108 of the disc and raised rims 110 elevated above the base surface 108 surrounding holes 106. The slider 72 is supported via raised rims 110 to define the head media interface to limit the contact interface area between the slider 72 and disc surface for stiction control. Thus, the contact interface of the slider 72 with the disc surface is limited to rims 110 which reduces stiction between the slider 72 and disc surface.

Figure 5:
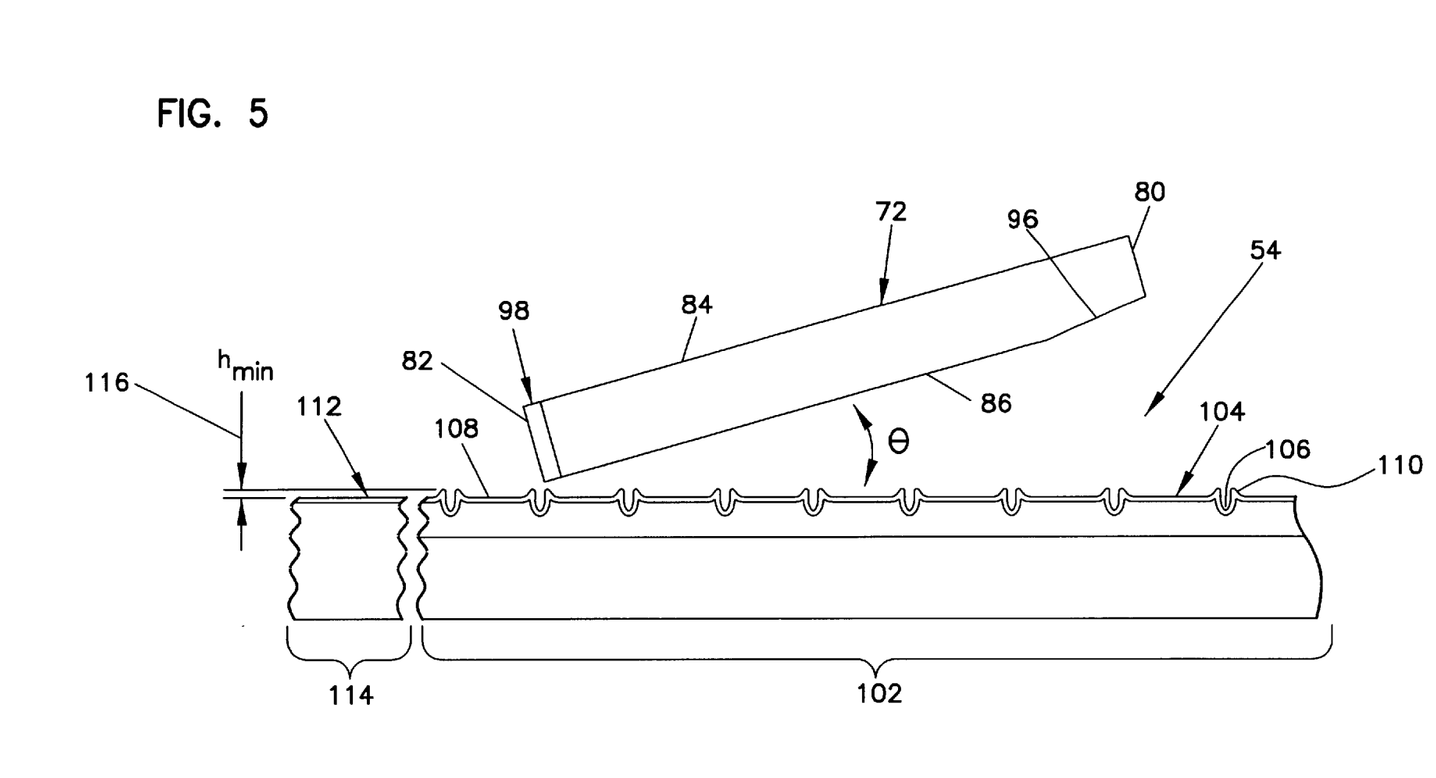
FIG. 5 is an illustrative view of a slider "taking off" from the landing zone and flying at a pitch angle relative to the disc surface.

Sliders typically fly above the disc surface at a pitch angle via operation of the suspension assembly so the trailing edge 82 supporting the transducer elements flies closer to the disc surface than the leading edge 80. The pitch angle is controlled via the dynamics of the suspension assembly 74. During operation, after take off of the slider from the disc surface, the slider flies at a generally constant fly height for read or write operations. FIG. 5 illustrates the slider flying at a pitch angle θ. After "take-off", actuator block 62 rotates to position heads 60 relative to desired data tracks for read or write operations. As shown base surface 108 of the landing zone coincides with the upper surface 112 of a data portion 114 of the disc. As shown, the slider must fly high enough, $h_{fly\ MIN}$ 116, to avoid contact with the rims 110. Contact with the rims 110 may damage the transducer elements. Since rims 110 extend above base surface 108 this increases the fly height dimension of the head from the disc surface 112 in the data zone.

Figure 6:
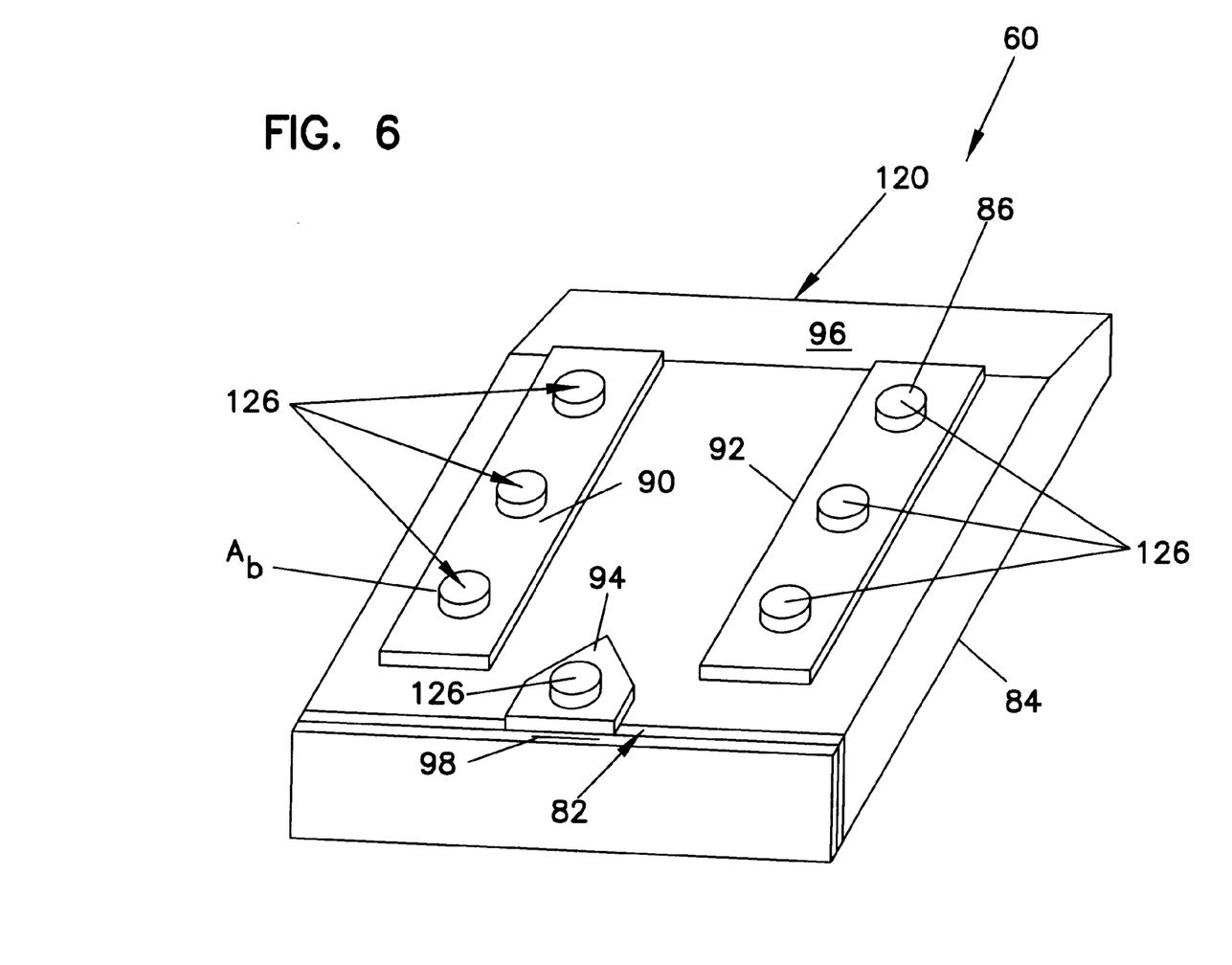
FIG. 6 is a perspective view of a slider including bumps extending from rails of a bearing surface.
Figure 7:
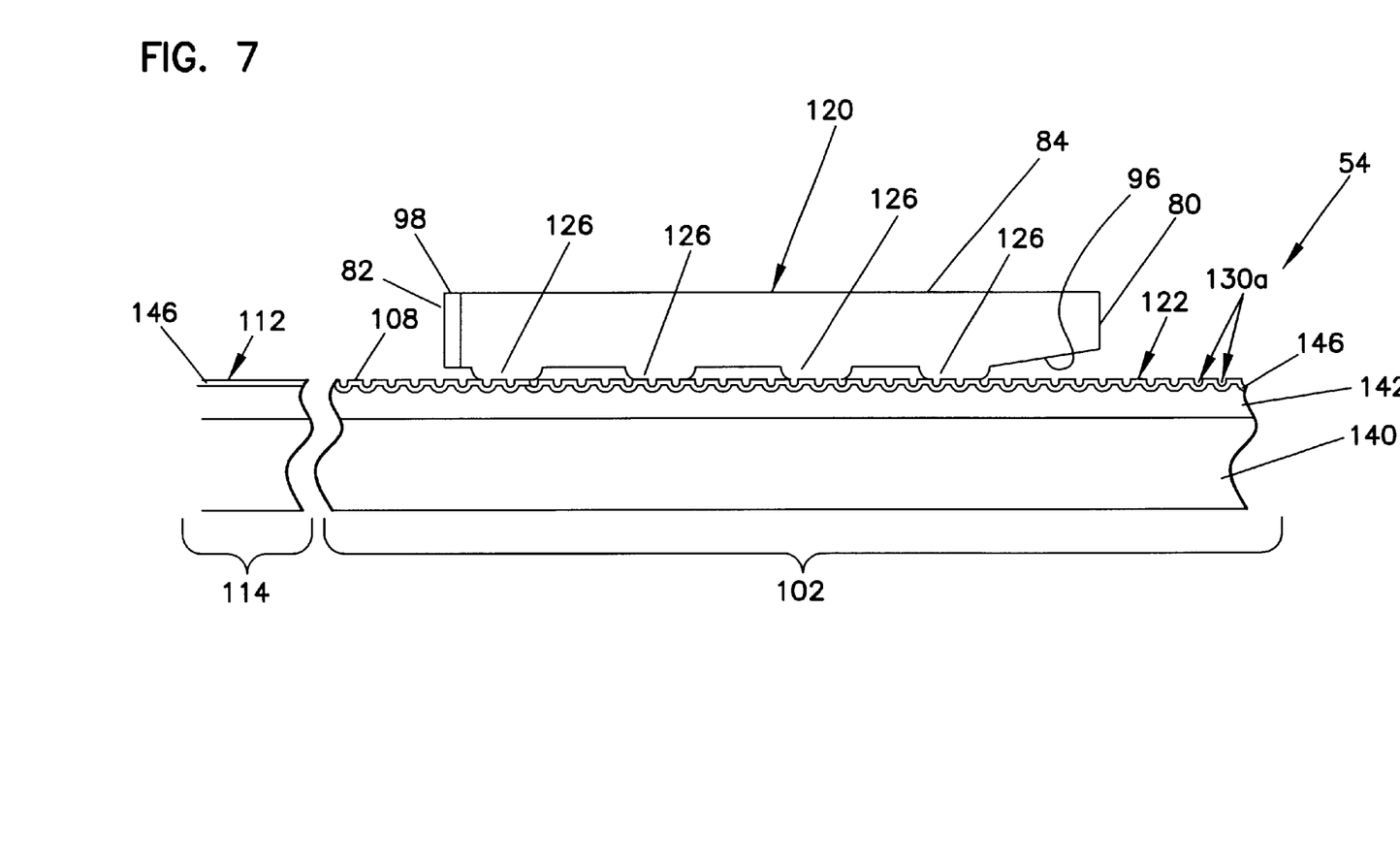
FIG. 7 is an illustrative view of an embodiment of a disc surface and slider parked on a landing zone of the disc surface of the present invention.

Areal disc drive density is increasing and slider fly height is decreasing for desired read or write resolution. Prior landing zone designs limit reduction in fly high dimension because of head contact with prior textured media surfaces as illustrated in FIG. 5. FIGS. 6–7 illustrate a slider 120 and disc surface structure 122 cooperatively designed to limit stiction while providing desired fly height. Like numbers are used to identify like parts of slider 120 and slider 72 illustrated in FIG. 3. In the slider 120, the bearing surface 86 includes bumps 126 elevated above and extending from raised rails 90, 92 and center rail 94. The bumps 126 are located at dispersed positions on the bearing surfaces and define a media contact interface surface for the slider 120. Although a particular pattern of bumps 126 is illustrated in FIG. 6, the invention is not limited to the particular pattern shown.

Figure 8:
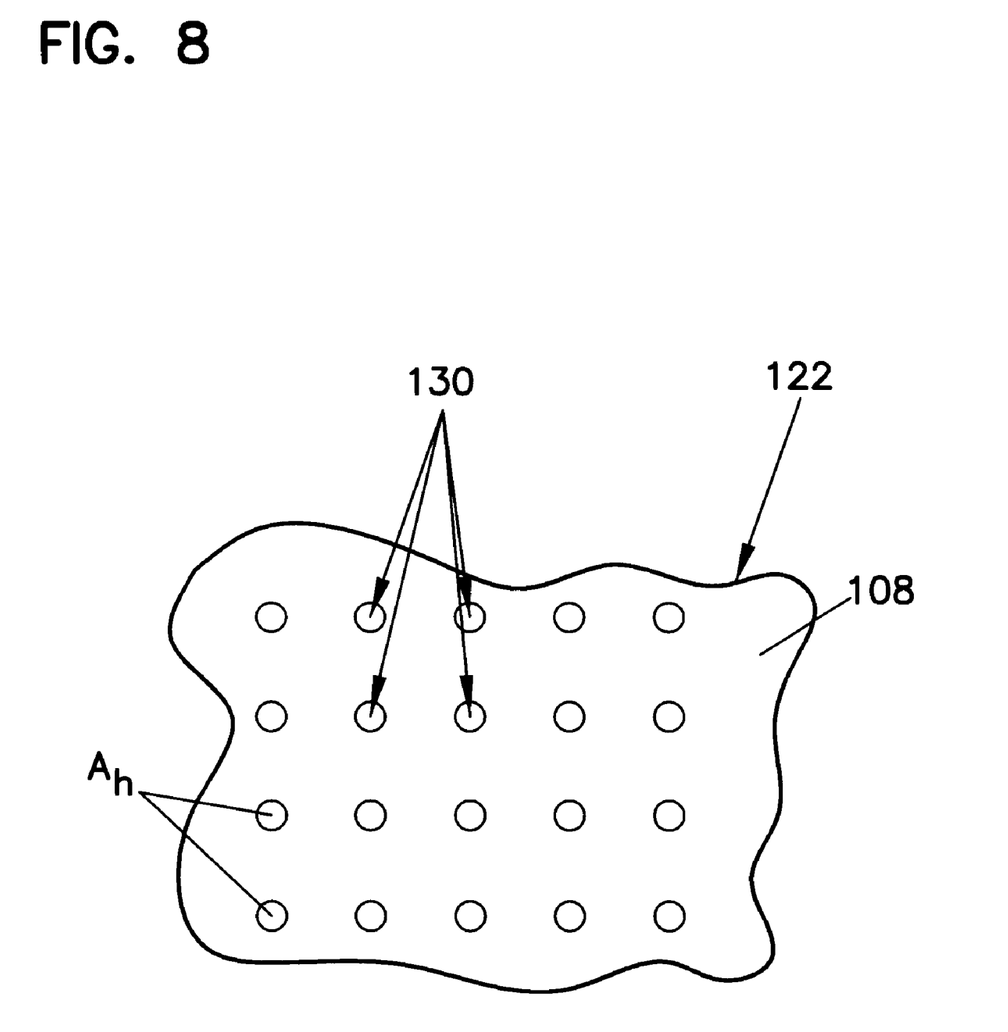
FIG. 8 is an illustrative view of a portion of the landing zone illustrating a pattern of holes formed in the disc surface.

As shown in FIGS. 7 and 8 the disc surface structure 122 includes a pattern of dispersed holes 130 extending below the base surface 108 of generally uniform dimension. The base surface 108 defines an elevated surface of the disc defining the contact interface surface of the disc with the slider 120. Base surface 108 is a relatively smooth surface and limits fly height interference to provide a relatively low glide avalanche height. Thus, while the slider 120 is parked on the disc surface, bumps 126 and base surface 108 interrupted by holes 130 provides the head media interface for stiction control.

Figure 9:
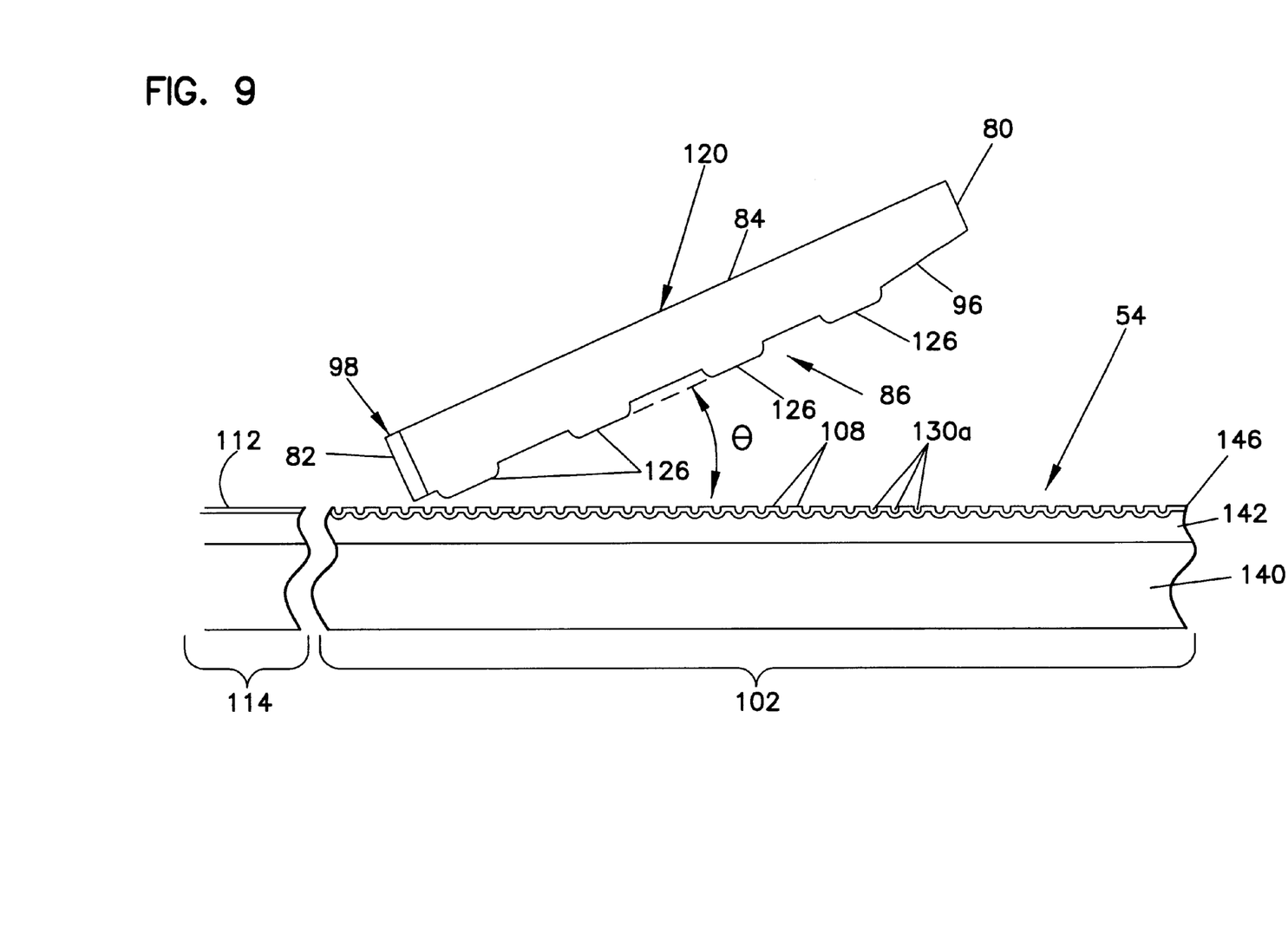
FIG. 9 is an illustrative view of the slider of FIG. 8 "taking off" from the disc surface of FIG. 8 and flying above the disc surface.

As illustrated in FIG. 9, since the contact surface of the landing zone is defined by base surface 108 of the disc, the slider may fly at a relatively low fly height without exceeding the avalanche error threshold since the contact interface surface of the disc is not elevated above upper surface 112 of the data storage portion 114. Prior mechanical textured landing zones were exposed to wear by continuous contact between the slider and textured surface structure. Contact over time smoothed the roughened structure thereby reducing stiction control. The holes 130 formed into the base surface 108 at spaced intervals are less susceptible to contact damage and wear.

As shown in FIGS. 7 and 9, disc 54 is formed of a substrate base 140, formed of a glass, ceramic or an aluminum material. The substrate 140 has a nichel-phosphorus NiP 142 layer over the substrate base 140 and a magnetic layer, not shown. A carbon overcoat 146 is formed over the magnetic layer to provide wear resistance. In one embodiment of the surface structure illustrated in FIG. 7, holes 130a are formed in the NiP layer by laser texturing. Prior to forming the holes, the NiP 142 is polished via known lapping or polishing techniques. Thereafter laser texturing is used to form holes having rims as illustrated in FIG. 4. Thereafter rims are removed via a mechanically texturing process to form a defined surface pattern as illustrated in FIGS. 7–8. The magnetic layer (not shown) and carbon overcoat 146 are sputter over the NiP 142 layer to form the disc.

Figure 10:
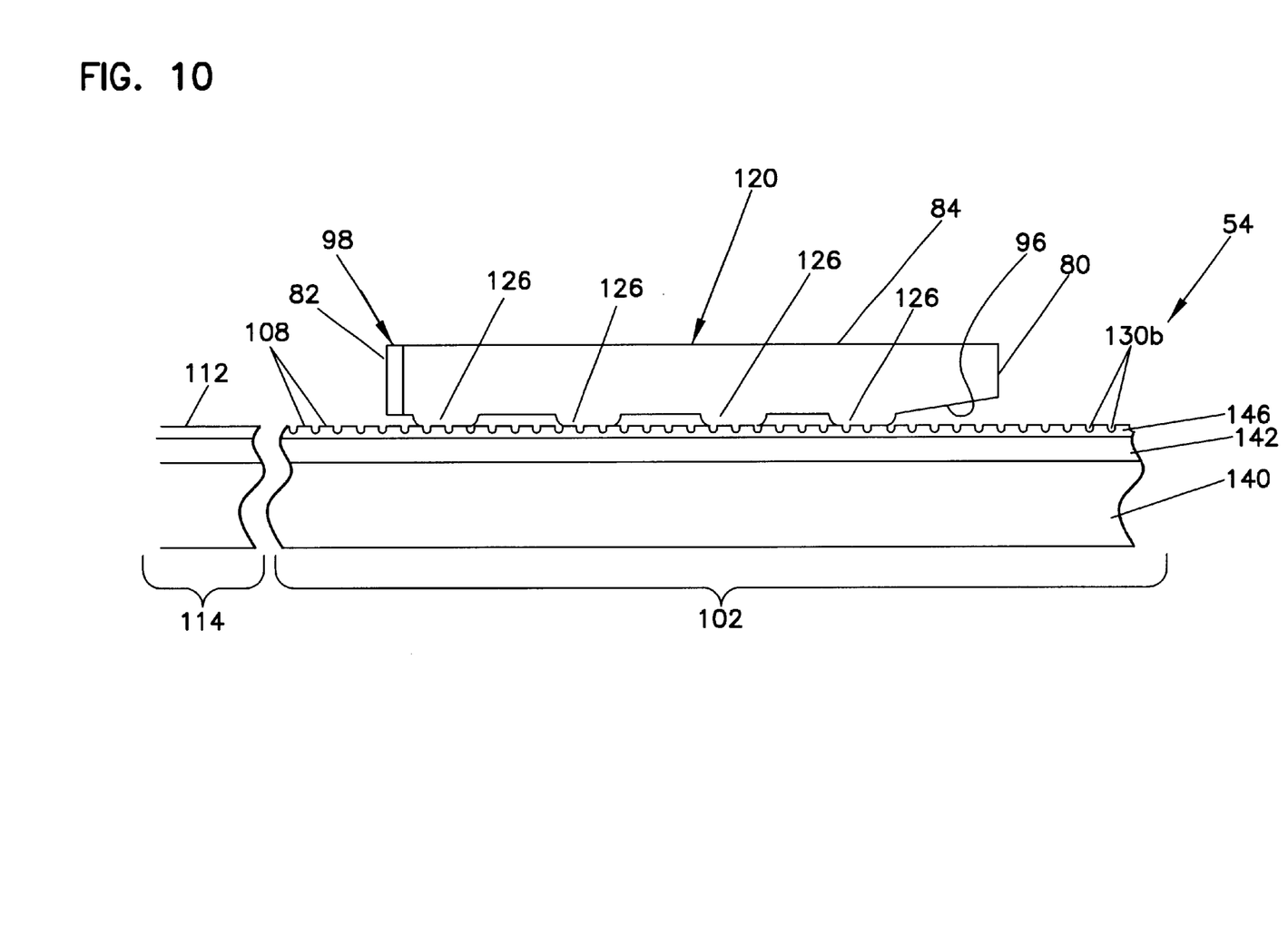
FIG. 10 is an illustrative view of an alternate embodiment of a disc surface and slider parked on a landing zone of the disc surface of the present invention.

In an alternate embodiment as illustrated in FIG. 10, the surface structure pattern is formed in the carbon overcoat 146. The NiP layer 142 is polished to a smooth surface after applied to the substrate base 140. Preferably, the NiP layer is textured to an Ra (Roughness Average) of 2–5 Å, to form a relatively smooth surface. The magnetic layer and carbon overcoat 146 are sputtered on the smooth NiP layer 142. Thereafter the carbon overcoat 146 is laser textured to form holes 130 surrounded by rims. The carbon overcoat 146 is laser textured using a special pulse laser having pulse wavelength and energy of 0.5–10.0 μm, 1–5 μJ (Joules) The rims are removed by mechanical texturing techniques to form holes 130b and a relative smooth contact interface surface at the base surface 108 of the disc.

During CSS, the slider hits or slams the disc surface. Repeat contact of the head with the disc surface may deform or alter mechanically textured surfaces. In the embodiment illustrated in FIG. 10, holes 130b are formed in the relatively hard carbon material which provides structural integrity and wear resistance for the hole and patterned surface structure. Although a carbon overcoat 146 is described, it should be understood that application is not limited to carbon and alternate hard protective overcoat layers may be used.

In a preferred embodiment, the bumps 126 having an area dimension $A_b$ of approximately 20–100 μm², as illustrated in FIG. 6, and a height of approximately 1–1.5 μinches. Although round bumps are shown, alternate shaped bumps and pattern of bumps may be used. Preferably, holes 130 have an area $A_h$ dimension of 10–20 $\mu m^2$ and a depth of 0.2–0.5 $\mu$inches. The areal density of the holes 130 is preferably 10 million holes per $in^2$. Although round holes 130 are shown, alternate shaped holes may be formed. Although a laser method for forming holes is described, holes may also be formed by photolithography or other processes forming controlled, relatively uniform patterned holes extending below the base surface of the disc.

Thus, as described, the present invention relates to a slider and disc interface for CSS having stiction control features and which is adapted for relatively low fly heights. In particular the slider and disc surface include contact interface elements which cooperatively provide a low stiction head media interface. For example, the head/media interface described may have stiction force less than or equal to 2 grams. The contact interface elements described also provide a relative low glide avalanche height of approximately less than or equal to 0.5 $\mu$inches.

Although the present invention has been described with reference to preferred embodiments, workers skilled in the art will recognize that changes may be made in form and detail without departing from the spirit and scope of the invention. In particular, although the invention is describe with respect to a magnetic data storage system, the invention may be applied to alternate data storage systems, such as an optical system.

What is claimed is:

1. In combination:
   a slider adapted to support at least one transducer element, said slider including a raised bearing surface said raised bearing surface including a plurality of bumps extending from the raised bearing surface dispersed at spaced locations between a leading edge and a trailing edge of the slider, the bumps providing a slider contact surface; and
   a data storage disc adapted to store digital information, said data storage disc including a relatively smooth polished base surface having a relatively low roughness average $R_a$ and a portion of the polished base surface having the low roughness average $R_a$ including a plurality of dispersed generally uniform holes formed in the polished base surface and extending below the polished base surface having the relatively low roughness average $R_a$ and the holes have a rimless surface structure above the polished base surface.

2. The combination of claim 1 wherein the bumps have an area dimension of 20–100 $\mu m^2$.

3. The combination of claim 1 wherein the holes have an area dimensions of 10–20 $\mu m^2$.

4. The combination of claim 1 wherein the bumps have a height dimension of approximately 1–1.5 $\mu$inches.

5. The combination of claim 4 wherein the holes are formed via a laser texturing technique.

6. The combination of claim 4 wherein the disc is formed of a substrate having a nickel-phosphorus layer and said holes are laser formed in the nickel phosphorus layer.

7. The combination of claim 6 wherein the substrate is an aluminum material.

8. The combination of claim 6 wherein the disc includes a carbon overcoat.

9. The combination of claim 1 wherein the holes have a depth dimension of approximately 0.2–0.5 $\mu$inches.

10. The combination of claim 1 wherein the disc is formed of a substrate, a nickel phosphorus layer and a carbon overcoat and the holes are laser formed on the carbon overcoat.

11. The combination of claim 10 wherein the substrate is aluminum.

12. In combination:
    a slider adapted to support at least one transducer element, said slider including a raised bearing surface, said raised bearing surface including a slider contact means extending from the raised bearing surface for slider contact interface; and
    a data storage disc adapted to store digital information, said data storage disc including a disc interface means for slider disc interface with low glide avalanche height and stiction control means for slider-disc stiction control.

13. In combination:
    a disc having a disc surface;
    a slider adapted to support at least one transducer element; and
    a slider disc interface means for providing a slider-disc interface for stiction control and relatively low glide avalanche height.

14. In combination:
    a slider adapted to support at least one transducer element, said slider including a raised bearing surface said raised bearing surface including a plurality of bumps extending from the raised bearing surface dispersed at spaced locations between a leading edge and a trailing edge of the slider, the bumps providing a slider contact surface; and
    a data storage disc adapted to store digital information, said data storage disc including a relatively smooth polished base surface having a relatively low roughness average $R_a$ and a portion of the polished base surface having the low roughness average $R_a$ including a plurality of holes dispersed in a generally uniform pattern in the polished base surface and extending below the polished base surface.

* * * * *

UNITED STATES PATENT AND TRADEMARK OFFICE
CERTIFICATE OF CORRECTION

PATENT NO. : 6,535,352 B2 Page 1 of 1
DATED : March 18, 2003
INVENTOR(S) : Jack Jialuo Xuan It is certified that error appears in the above-identified patent and that said Letters Patent is hereby corrected as shown below:

<u>Title page,</u>
Item [75], Inventors, replace "Jack Jialno Xuan" with -- Jack Jialuo Xuan --

Signed and Sealed this

Twenty-eighth Day of October, 2003

JAMES E. ROGAN
*Director of the United States Patent and Trademark Office*